United States Patent [19]

Baker

[11] Patent Number: 4,756,500

[45] Date of Patent: Jul. 12, 1988

[54] SUPPORT DEVICE FOR A WORK TOOL

[76] Inventor: Charles F. Baker, 435 Mauna Loa Ct., Merritt Island, Fla. 32953

[21] Appl. No.: 56,719

[22] Filed: Jun. 2, 1987

[51] Int. Cl.[4] .............................................. F16M 13/00

[52] U.S. Cl. .............................. 248/240.3; 248/221.4; 211/149; 108/44; 108/134

[58] Field of Search ............... 248/637, 646, 674, 122, 248/218.4, 219.1, 221.4, 240, 240.3, 240.4, 241, 243, 284; 52/36; 296/169, 174, 26, 37.6, 32, 22, 3, 13; 312/313; 108/48, 44, 134; 224/42.43, 42.44; 280/760; 211/149, 195, 104; 182/82

[56] References Cited

U.S. PATENT DOCUMENTS

| | | | |
|---|---|---|---|
| 646,835 | 4/1900 | Jackson . | |
| 666,916 | 1/1901 | Bates | 248/240.3 |
| 1,207,074 | 12/1916 | Pike | 248/240.4 |
| 1,224,129 | 5/1917 | Bohn | 248/240.4 |
| 1,232,874 | 7/1917 | Whealon | 248/240.4 |
| 1,267,046 | 5/1918 | Beaird | 248/240 |
| 1,482,081 | 1/1924 | Loncosty . | |
| 1,596,346 | 8/1926 | Gibson | 211/104 |
| 1,692,880 | 11/1928 | Wirth | 211/104 |
| 1,785,342 | 12/1930 | Gilbert | 403/100 |
| 2,162,855 | 6/1939 | Nelson . | |
| 2,584,196 | 2/1952 | Fernandes . | |
| 2,636,549 | 4/1953 | Geller | 248/240.4 |
| 2,716,044 | 8/1955 | Overby | 108/134 |
| 2,835,522 | 5/1958 | Serto | 248/240.4 |
| 3,161,223 | 12/1964 | Marsh . | |
| 3,184,068 | 5/1965 | Wende | 248/240.3 |
| 3,214,032 | 10/1965 | Hightower | 211/104 |
| 3,233,745 | 2/1966 | Hershberger | 211/104 |
| 3,817,075 | 6/1974 | Marsh et al. . | |
| 4,240,279 | 12/1980 | Rhoades . | |
| 4,450,121 | 5/1984 | Bequette | 248/240.3 |
| 4,527,827 | 7/1985 | Maniscalco et al. . | |
| 4,600,232 | 7/1986 | Phillips . | |

FOREIGN PATENT DOCUMENTS

| | | | |
|---|---|---|---|
| 7238 | 5/1932 | Australia | 403/92 |
| 535083 | 12/1956 | Canada | 248/240 |
| 5575 | 4/1956 | Fed. Rep. of Germany | 248/240 |
| 2948453 | 6/1980 | Fed. Rep. of Germany | 248/240.4 |
| 1325630 | 3/1963 | France | 211/104 |

*Primary Examiner*—J. Franklin Foss
*Assistant Examiner*—Robert A. Olson
*Attorney, Agent, or Firm*—Banner, Birch, McKie & Beckett

[57] ABSTRACT

A support device for a work tool such as metal bending brake is disclosed. The device includes a plurality of support guides vertically mounted on a truck rack. A movable tool support mechanism is connected to each of the support guides for movably supporting the tool in either a storage position adjacent the rack or in a generally horizontal work position. Each support mechanism includes a base adapted to hold the tool and is formed of first and second sections pivotably connected to each other, and a stabilizer formed of first and second elongate bars pivotably connected to each other.

12 Claims, 2 Drawing Sheets

SUPPORT DEVICE FOR A WORK TOOL

TECHNICAL FIELD

The present invention relates to a support device for a work tool such as a metal bending brake. More particularly, the present invention relates to a support device for a metal bending brake which is attached to a support frame of a truck and which may be folded for transport and storage and unfolded for use.

BACKGROUND OF THE INVENTION

Sheet metal brakes are used for bending and forming sheet metal. In use, the sheet metal is clamped between an anvil member and a clamping surface, and the sheet metal is bent around the anvil member by a hinged bending member. The anvil member is resiliently supported on the upper arms of C-shaped members.

Often, it is desirable to transport metal bending brakes to various work sites. However, existing portable brakes require complicated set up procedures. The brake cannot be simply set down and used; it must be properly anchored to resist motion. Thus, once the metal bending brake has been transported to a site, it must be removed from the truck and the set up procedure undertaken. The present invention is designed to simplify the transport and use of such a tool. Other mechanical tools also require transport and set up at construction sites. The support device of the present invention would also simplify the transport and use of other mechanical tools.

SUMMARY OF THE INVENTION

It is an object of the present invention to provide a portable support device for a metal bending brake or other mechanical tool which enables the brake to be set up easily for use and dismantled for transportation and does not require removal, loading, or unloading from a transporting truck.

The support device for a work tool such as a metal bending brake includes a plurality of support guides vertically attached to a rack of a truck such as a pickup truck. The support guides could be bolted through a typically cylindrical pipe rack mounted on a pickup truck although any other method of mounting the support guides to the truck rack could be used. One side of the support guides has an opening to a channel formed within the support guides. In a preferred embodiment, the support guides have two sets of inside tracks disposed along opposite insides of the side walls of the channel of the support guides, and the portion of the side walls between each set of tracks has a series of corresponding openings along its length.

A movable tool support mechanism is connected to each of the support guides for movably supporting the tool in either a storage position adjacent the rack or in a generally horizontal work position. The support mechanism includes a base adapted to hold the tool having first and second sections pivotably connected to each other and a stabilizer pivotably connected to the base for supporting the base in the work position. The stabilizer has first and second elongate bars pivotably connected to each other. In a preferred embodiment, locking pivot wheels connect the first and second sections of the base and the first and second elongate bars of the stabilizer. A foldable locking brace may be disposed between the first and second sections of the base across its locking pivot wheel in the work position.

An inner end of the first section of the base is pivotably connected to a lower portion of a respective support guide. An inner end of the first elongate bar of the stabilizer is pivotably connected to a respective support guide at a location above the pivot connection of the first section of the base. The inner end of the first elongate bar has a T-bar, the upright portion of the T-bar being colinear with the inner end of the first elongate bar, and the cross portions of the T-bar being disposed within the inside tracks. The cross portions have outwardly biased tips engagable in the openings in the side walls. The T-bar further includes a recessed lever on the upright portion for moving the outwardly biased tips inwardly away from the openings to facilitate adjusting the location of the first end of the first elongate bar.

An outer end of the second elongate bar is pivotably connected to the base so that in the work position the first and second elongate bars extend downward at an acute angle to support the base. The first and second sections of the base are colinear to support the work tool on top of a tool support surface of the second section of the base. The support mechanism may be moved to the storage position by downward and inward pivot motion of the first elongate bar and inward and upward pivot motion of the second elongate bar about its pivot connection to the first elongate bar. The first section of the base pivots upward and inward of its pivot connection to the support guide, and the second section pivots inward and downward about its pivot connection to the first section to place the second section in a generally vertical position with the tool support surface facing outward of the rack. The first and second sections of the base and the first and second elongate bars of the stabilizer are received at least partially within the channel of the support guide in the storage position.

As an additional modification, a cross brace may be mounted between adjacent support guides and a connecting bracket may be mounted on the support guides for receiving the cross brace and connecting the cross brace to adjacent support guides. Shims for stabilizing the connection between the support guides and the members may also be fixed to the support guides adjacent the members.

Various additional advantages and features of novelty which characterize the invention are further pointed out in the claims that follow. However, for a better understanding of the invention and its advantages, reference should be made to the accompanying drawings and descriptive matter which illustrate and describe a preferred embodiment of the invention.

DETAILED DESCRIPTION OF PREFERRED EMBODIMENTS

As shown in the figures, a work tool such as metal bending brake 10 is disposed on a movable support device or frame which is mounted on a truck rack 14.

Figure 3:
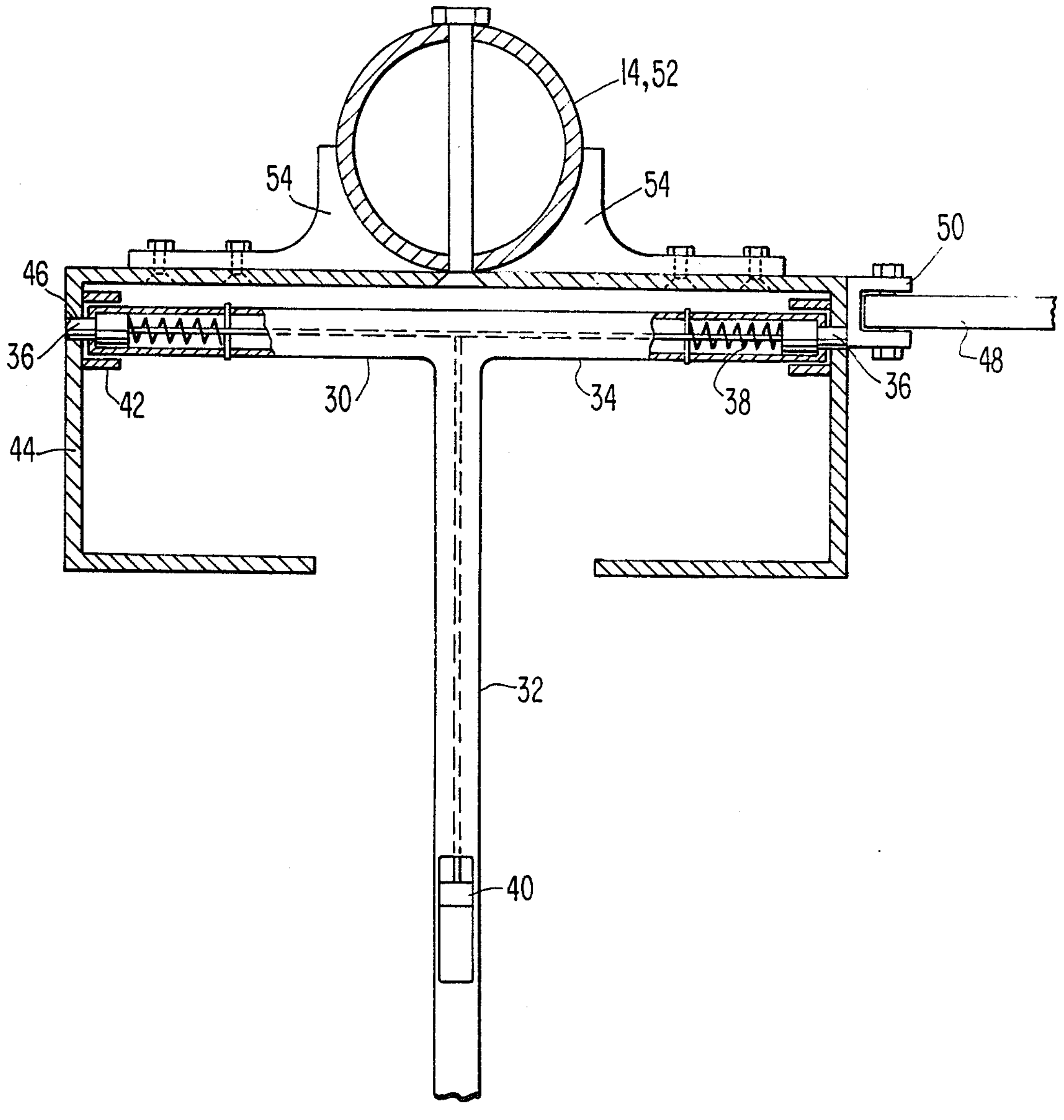
FIG. 3 is a top view of a rectangular channel guide.

Preferably a pickup truck is used and the truck rack is a conventional cylindrical pipe truck rack. Alternatively, brake 10 and the support device may be mounted inside or outside of a stepvan, on a trailer, or on a wall of a workshop. The support device includes support mechanism 12 which includes a plurality of generally rectangular-shaped support guides 16 (one of which is shown in the figures) permanently mounted in a vertical position and fixed to truck rack 14. Two support guides 16 are usually used although a third central support guide may also be used. Support guides 16 have an opening to a channel formed within their generally rectangular shape as can be seen in FIG. 3. Support guides 16 are mounted on cylindrical members 52 by any conventional means such as with bolts disposed through holes in the back portion of rectangular support guides 16. To further support frame 12, when support mechanism 12 is mounted on cylindrical members 52 of a truck rack, shims 54 may be mounted on the outside of support guides 16 adjacent cylindrical members 52. Cross braces 48 may be fixed between adjacent support guides 16 for further support. Connecting bracket 50 receives cross brace 48.

A movable tool support mechanism 12 is connected to each support guide 16. Each support mechanism 12 includes a tool support base and a stabilizer connected between the base and support guide 16. The tool support base includes first and second base sections 18, 20 pivotably connected to each other. First and second base sections 18, 20 may be grooved, channel-shaped extension bars to receive the stabilizer and decrease the size of the folded support device. First base section 18 is pivotably mounted at a first or inner end at the lowermost end of each support guide 16. First base section 18 may rotate from a storage position to a work position. In the storage position, first base section 18 is oriented vertically and extends upwardly from its first end. Pivotably connected to the second or outer end of first base section 18 is a second base section 20. First and second base sections 18, 20 together form a base having a tool supporting surface. Second base section 20 is connected at its first end to the second end of first base section 18 and also pivotably rotates from a storage position to a work position. In its storage position, second base section 20 extends vertically and downwardly from its first end. In a preferred embodiment, first base section 18 is connected to second base section 20 by a locking pivot wheel 22. Mounted adjacent the second end of second base section 20 is metal bending brake 10.

The stabilizer includes first and second elongate arms 24, 26, which may be elongate bars. Elongate arms 24, 26 further support base sections 18, 20. First elongate arm 24 is adjustably connected at a first or inner end to support guide 16. The second end is pivotably attached to the first end of second elongate arm 26. The second or outer end of second elongate arm 26 is pivotably attached to locking pivot wheel 22 between first and second base sections 18, 20. In a preferred embodiment, locking pivot wheel 28 serves as the pivotable connection between first elongate arm 24 and second elongate arm 26.

As best shown in FIG. 3, the adjustable attachment mechanism of first elongate arm 24 is a T-bar 30 and includes upright portion 32 and cross portions 34. Cross portions 34 each include outwardly biased tips 36 being biased by springs 38. Recessed lever 40 disposed on upright portion 32 releases outwardly biased tips 36 to permit adjusting the position of first elongate arm 24. Recessed lever 40 includes a device (not shown) for holding the lever in the "open" position when brake 10 is pivoted between its storage and work positions. The holding device may be a pin, a notch which mates with a nub, or any other known device. Cross portions 34 travel within inside tracks 42 disposed on the inside of side portions 44 of rectangular-shaped support guides 16. Within inside tracks 42 on side portions 44 are a series of corresponding openings 46 permitting entry of outwardly biased tips 36 to securely position first elongate arm 24. Outwardly biased tips 36 may be beveled or rounded at their ends to facilitate their sliding within inside tracks 42 and their insertion into openings 46.

Additional support of base sections 18, 20 may be provided by a folding locking brace 56 which is removably mounted at a first end on first base section 18 and at a second end on second base section 20, preferably by a nonremovable flathead bolt or pin inserted through a vinyl sleeve. Locking brace 56 is disposed across pivot wheel 22 and secures base sections 18, 20 in their work position. Safety pin 58 may be inserted through corresponding openings in second base section 20, first base section 18, and support guide 16 to secure and lock base sections 18, 20 in their storage position. Safety pin 58 prevents inadvertent release of the brake and support device during transportation and also serves as an anti-theft device.

Figure 1:
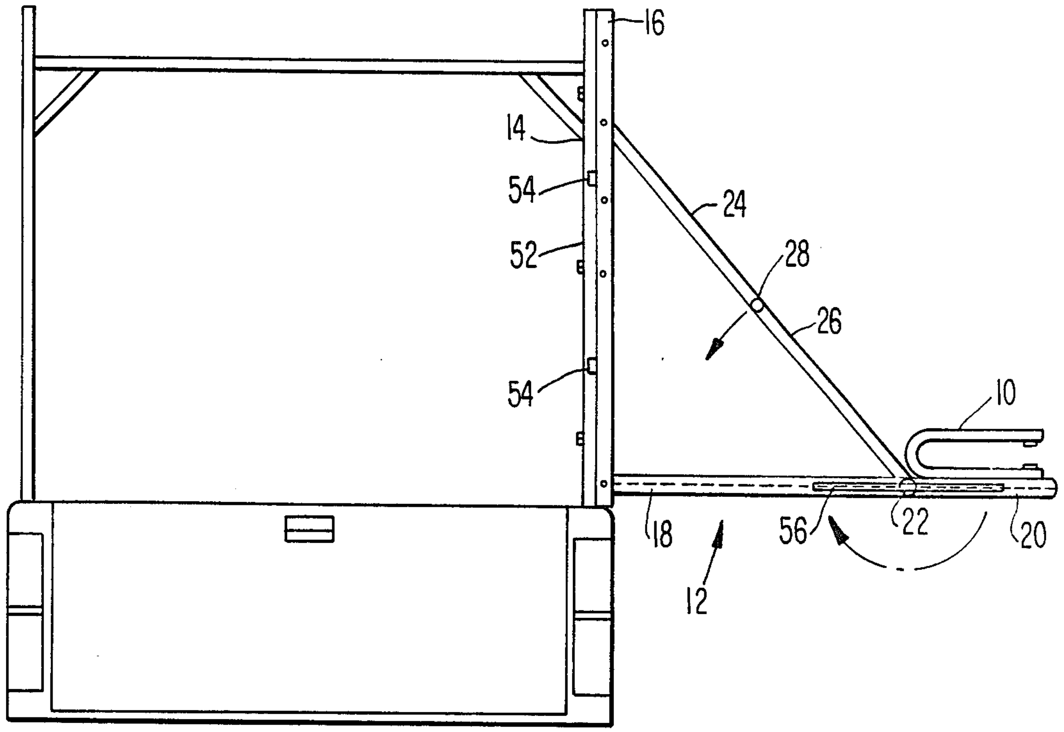
FIG. 1 is a side view of the metal bending brake and frame mounted on a truck and opened to its working position.
Figure 2:
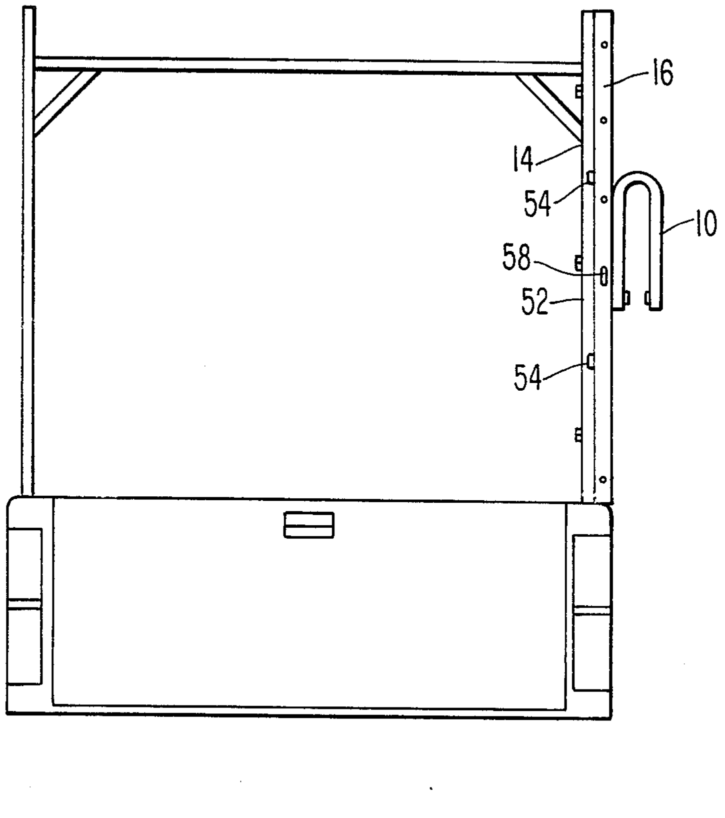
FIG. 2 is a side view of the metal bending brake and frame mounted on a truck in its transporting position.

As shown in FIG. 2, brake 10, when in its storage position, is located downwardly from the top of support guides 16 at a point above the pivot connection between base section 18 and support guide 16. In order to provide additional space below brake 10 for tool boxes, additional workspace, or other purposes, the relative lengths of support guides 16, base sections 18, 20, and elongate arms 24, 26 may be varied to locate brake 10 higher above the base section - support guide pivot connection than shown in FIG. 2.

In operation, support mechanism 12 is folded and placed in its storage position as shown in FIG. 2. To open support mechanism 12 for use, first base section 18 is pivoted about its first end and is lowered into a horizontal position while second base section 20 is pivoted about its first end and rotates 180 degrees to extend colinearly with first base section 18. First elongate arm 24 is pivoted about its first end while its first end is vertically adjusted to a position which brings it colinear with second elongate arm 26 which rotates away from first base section 18. When base sections 18, 20 are disposed horizontally and elongate arms 24, 26 are colinear, outwardly biased tip 36 of cross portion 34 of T-bar 30 are disposed adjacent a pair of openings 46 in rectangular support guides 16. Outwardly biased tip 36 engage openings 46 to securely hold elongate arms 24, 26 in position and to securely support base sections 18, 20 horizontally. Locking pivot wheels 22, 28 are locked to further secure support mechanism 12 in its working position. Folding locking brace 56 may then be placed along base sections 18, 20.

Numerous characteristics and advantages of the invention have been described in detail in the foregoing description with reference to the accompanying drawings. However, the disclosure is illustrative only and the invention is not limited to the precise illustrated embodiment. Various changes and modifications may be affected therein by one skilled in the art without departing from the scope or spirit of the invention.

I claim:

1. A support device for carrying an elongate work tool such as a metal bending brake on the side of a generally vertical support surface such as a rack of a truck comprising:

a plurality of support guides for attachment to the generally vertical support surface, one side of said support guides having an opening to a channel formed within said support guides; and a movable tool support mechanism connected to each of said support guides for movably supporting the tool in either a storage position adjacent the vertical support surface or in a generally horizontal work position, each of said support mechanisms comprising:

a base adapted to hold the tool, said base having first and second sections pivotably connected to each other about a first pivot; and a stabilizer connected to said base for supporting said base in said work position, said stabilizer having first and second elongate bars pivotably connected to each other about a second pivot;

an inner end of said first section of said base being pivotably connected to a lower portion of a respective one of said support guides about a third pivot, an inner end of said first elongate bar of said stabilizer being pivotably connected to a respective one of said support guides about a fourth pivot at a location above said third pivot, and an outer end of said second elongate bar being pivotably connected to said base about a fifth pivot at a location spaced inward of an outer end of said second section so that in the work position said first and second elongate bars extend colinearly downward at an acute angle to support said base and to support the work tool on top of a tool support surface of said base in an area between said fifth pivot and said outer end of said second section, and said first, second, third, fourth, and fifth pivots are disposed relative to one another so that said support mechanism is movable to said storage position by downward and inward pivot motion of said first elongate bar about said fourth pivot and upward and inward pivot motion of said second elongate bar about said second pivot to pivot said first section of said base upward and inward about said third pivot and to pivot said second section of said base inward and downward about said first pivot to place said second section in a generally vertical position with said tool support surface facing outward of the vertical support surface.

2. A support device as set forth in claim 1 wherein said first and second sections of said base and said first and second elongate bars of said stabilizer are received at least partially within said channel of said support guide when said support device is in said storage position.

3. A support device as set forth in claim 1 wherein said first and second pivots comprise first and second locking pivot wheels for pivotably connecting said first and second sections of said base and said first and second elongate bars, respectively.

4. A support device as set forth in claim 3 further comprising a foldable locking brace disposed between said first and second sections of said base across said first locking pivot wheel when said support device is in said work position.

5. A support device as set forth in claim 1 further comprising a cross brace mounted between adjacent ones of said support guides and a connecting bracket mounted on said support guides for receiving said cross brace and connecting said cross brace to said support guides.

6. A support device as set forth in claim 5 including shims for placement between said support guides and the generally vertical support surface.

7. A support device as set forth in claim 1 wherein said first and fifth pivots are a common pivot.

8. A support device for carrying an elongate work tool such as a metal bending brake on the side of a generally vertical support surface such as a rack of a truck comprising:

a plurality of generally rectangular-shaped support guides for attachment to the generally vertical support surface, one side of said support guides having an opening to a channel formed within the generally rectangular shape of said support guides, said support guides comprising two sets of inside tracks disposed along opposite insides of the side walls of said channel of said support guides wherein the portion of said side walls between each set of tracks has a series of corresponding openings along its length;

a movable tool support mechanism connected to each of said support guides for movably supporting the tool in either a storage position adjacent the vertical support surface or in a generally horizontal work position, each of said support mechanisms comprising:

a base adapted to hold the tool, said base having first and second sections pivotably connected to each other by a first locking pivot wheel;

a foldable locking brace disposed between said first and second sections of said base across said first locking pivot wheel in said work position; and a stabilizer pivotably connected to said base for supporting said base in said work position, said stabilizer comprising first and second elongate bars pivotably connected to each other by a second locking pivot wheel;

an inner end of said first section of said base being pivotably connected to a lower portion of a respective one of said support guides; an inner end of said first elongate bar of said stabilizer being pivotably connected to a respective one of said support guides at a location above said pivot connection of said first section of said base, said inner end of said first elongate bar having a T-bar, the upright portion of said T-bar being colinear with said inner end of said first elongate bar and the cross portions of said T-bar being disposed within said inside tracks having outwardly biased rounded tips engagable in said openings in said side walls, said T-bar further comprising a recessed lever on said upright portion for moving said outwardly biased tips inwardly away from said openings to facilitate adjustment of the location of said inner end of said first elongate bar; an outer end of said second elongate bar being pivotably connected to said base so that in the work position said first and second elongate bars extend colinearly downward at an acute angle to support said base and to support the work tool on top of a tool support surface of said second section of said base, and said support mechanism being movable to said storage position by downward and inward pivot motion of said first elongate bar and upward and inward pivot motion of said second elongate bar about its pivot connection to said first elongate bar to pivot said first section of said base upward and inward of its pivot connection to said support guide and to pivot said second section of said base inward and downward of its pivot connection to said first section to place said second section in a generally vertical position with said tool support surface facing outward of the vertical support surface, said first and second sections of said base and said first and second elongate bars of said stabilizer being received at least partially within said channel of said support guide when said support device is in said storage position;

a cross brace mounted between adjacent ones of said generally rectangular-shaped support guides and a connecting bracket mounted on said support guides for receiving said cross brace and connecting said cross brace to said support guides; and shims for placement between said support guides and the generally vertical support surface.

9. A support device for carrying an elongate work tool such as a metal bending brake on the side of a generally vertical support surface such as a rack of a truck comprising:

a plurality of generally rectangular-shaped support guides for attachment to the generally vertical support surface, one side of said support guides having an opening to a channel formed within the generally rectangular shape of said support guides, said support guides comprising two sets of inside tracks disposed along opposite insides of the side walls of said channel of said support guides wherein the portion of said side walls between each set of tracks has a series of corresponding openings along its length; and a movable tool support mechanism connected to each of said support guides for movably supporting the tool in either a storage position adjacent the vertical support surface or in a generally horizontal work position, each of said support mechanisms comprising:

a base adapted to hold the tool, said base having first and second sections pivotably connected to each other; and a stabilizer connected to said base for supporting said base in said work position, said stabilizer having first and second elongate bars pivotably connected to each other, said inner end of said first elongate bar comprising a T-bar, the upright portion of said T-bar being colinear with said inner end of said first elongate bar and the cross portions of said T-bar being disposed within said inside tracks having outwardly biased rounded tips engagable in said openings in said side walls, and said T-bar further comprising a recessed lever on said upright portion for moving said outwardly biased tips inwardly away from said openings to facilitate adjustment of the location of said inner end of said first elongate bar;

an inner end of said first section of said base being pivotably connected to a lower portion of a respective one of said support guides, an inner end of said first elongate bar of said stabilizer being pivotably connected to a respective one of said support guides at a location above said pivot connection of said first section of said base, and an outer end of said second elongate bar being pivotably connected to said base so that in the work position said first and second elongate bars extend colinearly downward at an acute angle to support said base and to support the work tool on top of a tool support surface of said second section of said base, and said support mechanism being movable to said storage position by downward and inward pivot motion of said first elongate bar and upward and inward pivot motion of said second elongate bar about its pivot connection to said first elongate bar to pivot said first section of said base upward and inward of its pivot connection to said support guide and to pivot said second section of said base inward and downward of its pivot connection to said first section to place said second section in a generally vertical position with said tool support surface facing outward of the vertical support surface, said first and second sections of said base and said first and second elongate bars of said stabilizer being received at least partially within said channel of said support guide when said support device is in said storage position.

10. A support device as set forth in claim 9 further comprising first and second locking pivot wheels for pivotably connecting said first and second sections of said base and said first and second elongate bars, respectively.

11. A support device as set forth in claim 10 further comprising a foldable locking brace disposed between said first and second sections of said base across said first locking pivot wheel when said support device is in said work position.

12. A support device as set forth in claim 9 further comprising a cross brace mounted between adjacent ones of said generally rectangular-shaped support guides and a connecting bracket mounted on said support guides for receiving said cross brace and connecting said cross brace to said support guides.

* * * * *